United States Patent Office 3,387,035
Patented June 4, 1968

3,387,035
FLUORINE SUBSTITUTED BENZOPHENONE
ULTRAVIOLET ABSORBERS
Don Norman Gray, Baltimore, Md., and Roger Dale Knight, Phoenix, Ariz., assignors to the United States of America as represented by the Secretary of the Air Force
No Drawing. Filed Nov. 4, 1963, Ser. No. 321,378
8 Claims. (Cl. 260—591)

This invention relates to new ultraviolet radiation absorbers, more particularly it relates to new ultraviolet absorbers having the general formula:

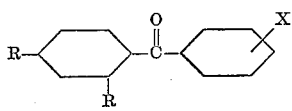

wherein R may be methoxy or hydroxy and X may be fluorine, a fluoroalkyl radical having from 1 to 9 carbon atoms, or a fluoroalkenyl radical having from 1 to 9 carbon atoms. The substituent X may be straight or branch chained, saturated or unsaturated, located para, meta or ortho to the carbonyl group and includes such groups as trifluoromethyl-, monofluoromethyl-, difluoromethyl-, perfluorovinyl-, 2,2,2-trifluoromethyl-, perfluoroethyl-, perfluoropropyl-, perfluorobutyl-, and the like, as well as various other fluorine containing groups containing up to 9 carbon atoms.

The susceptibility of transparent or light colored plastics to the damaging effects of solar radiation has created a problem of paramount importance to the plastic industry. In an attempt to overcome this problem, various organic compounds have been suggested as stabilizers and absorbents for ultraviolet light radiation. Dihydroxy and hydroxy-methoxy benzophenones, for example, are well-known for their utility as absorbers for ultraviolet light and are used as stabilizing additives in a wide range of plastics, especially vinyl chloride and vinylidene chloride polymer formulations. Plastic materials that are sensitive to ultraviolet radiation degrade, discolor, craze and often show a loss of desirable physical and electrical properties when they are not protected by the inclusion of an effective ultraviolet radiation absorber. An effective absorber must have high absorptivity in the wavelength region most harmful to the plastic, should be colorless, must be able to absorb the harmful radiation and dissipate it by some mechanism without itself undergoing decomposition. It also should be compatible with the base plastic. Many of the prior ultraviolet absorbers suffer from various deficiencies such as the production of undesirable colors in the substrate material, loss of effectiveness after prolonged exposure to light and heat, and evaporization of the absorbent during hot molding and other heat treatments employed in the production of plastic materials.

The ultraviolet light absorbers of this invention, however, have proved to be extremely effective in preventing the degradation of plastic materials, especially those utilized in aircraft and spacecraft vehicles. The extreme temperatures and operational conditions encountered by these vehicles in the space environment tended to accelerate the degradation of these plastics and necessitated the formulation of light stabilizing additives that did not suffer from the aforementioned deficiencies of the prior art.

In accordance with this invention, however, it has been discovered that the above noted deficiencies of prior art additives can be abrogated by utilizing fluorine containing benzophenones as ultraviolet light absorbers. Of particular value are the trifluoromethyl substituted 2,4-dimethoxybenzophenones, 2,4-dihydroxybenzophenones and 2-hydroxy-4-methoxybenzophenones.

Accordingly, it is the primary object of this invention to provide a new class of fluorine-containing ultraviolet light absorbers.

Another object of this invention is to provide a new class of fluorine-containing stabilizing additives with high absorptivity in the most damaging ultraviolet region and low absorptivity in the visible region.

It is another object of this invention to provide a new class of fluorine-containing compounds with low volatility in non-polar solvents.

A further object of this invention is to provide a new class of fluorine-containing stabilizing additives that prevent the discoloration and degradation of polymeric compositions on exposure to sunlight and heat for prolonged periods of time.

Still a further object of this invention is to provide a new class of ultraviolet absorbers which are characterized by having little initial color, possess a low odor level, exhibit excellent stability against the deteriorating effects of light, and are compatible with a wide range of plastic substrates.

The novel features which are believed to be characteristic of the invention are set forth in the appended claims. However, the invention, both as to its organization and method of operation, together with further objects, features and advantages thereof, may best be understood by reference to the following detailed description.

In general, the compounds of this invention are prepared by affecting a reaction between resorcinol dimethyl ether and the appropriate fluoro-substituted benzoyl chloride in contact with an acylating catalyst, and in the presence of a solvent-diluent such as n-hexane or carbon disulfide. Catalysts may be chosen from a large group of acylation catalysts known to the chemical art; but aluminum chloride and titanium tetrachloride are preferred. In the preparation of the fluoro-substituted-2,4-dihydroxybenzophenones, resorcinol dimethyl ether is preferably replaced by resorcinol, the preferred catalyst being aluminum chloride.

The reaction apparatus utilized in the preparation of the compounds of this invention consists of a 500 ml. three-necked flask equipped with a reflux condenser, dropping funnel and a tru-bore stirring shaft fitted with a Teflon paddle. The condenser was equipped with a calcium chloride drying tube and every effort was made to keep the apparatus and the reagents dry throughout the reaction period.

This invention can best be illustrated by referring to the following examples in which parts are by weight unless otherwise specified. These examples are intended only as illustrations of specific embodiments of the invention and are not to be construed as limiting the scope of the invention in any way.

EXAMPLE 1

Aluminum chloride, 29.3 parts, is placed in a three-necked flask equipped with a reflux condenser, dropping funnel and stirrer and covered with 100 parts of n-hexane under anhydrous conditions. Meta-trifluoromethyl benzoyl chloride, 20.8 parts, is added with stirring. Resorcinol dimethyl ether, 15.1 parts, dissolved in 50 parts of n-hexane is added slowly. The resulting dark brown mixture is refluxed with stirring for eight hours. Water, 100 parts, is added followed by 100 parts of 15 percent hydrochloric acid. The resulting dark brown oil is separated, dried and submitted to fractional distillation. Recrystallization from 80 percent ethanol gives white needles containing less than 0.01 percent impurities on the basis of vapor phase chromatographic analysis. The product, 3'-trifluoromethyl-2-hydroxy-4-methoxy-benzophenone, has a melting point range of 65.5–66.0° C. Similar runs with the corresponding ortho or para trifluoromethyl benzoyl chloride yielded the corresponding substituted-2-hydroxy-4-methoxybenzophenone. Table I presents the melting points, boiling points, elemental analysis and solubilities of representative products produced by the method of Example 1 and compares them with a commercial sample of 2-hydroxy-4-methoxybenzophenone.

TABLE I

| Compound [1] | Melting Point [2] (° C.) | Boiling Point [3] (° C.) | Elemental Analysis | |
|---|---|---|---|---|
| | | | Calculated | Found |
| 2-hydroxy-methoxybenzophenone (commercial sample). | [4] 62–63 | 359–361 | | |
| 2'-trifluoromethyl-2-hydroxy-4-methoxybenzophenone. | 95.0–95.5 | 358–362 | C, 60.81; H, 3.74; F. 19.2 | C, 60.96; H, 3.73; F. 19.1. |
| 3'-trifluoromethyl-2-hydroxy-4-methoxybenzophenone. | 65.0–66.0 | 360–362 | F, 19.2; C, 60.81; H, 3.74 | C, 60.83; H, 3.51; F, 18.8. |
| 4'-trifluoromethyl-2-hydroxy-4-methoxybenzophenone. | 66.5–67.0 | 380–385 | C, 60.81; H, 3.74; F, 19.2 | C, 60.74; H, 3.68; F, 19.3. |
| 2'-fluoro-2-hydroxy-4-methoxybenzophenone | 49.0–50.0 | | | |
| 3'-fluoro-2-hydroxy-4-methoxybenzophenone | 88.5–89.5 | | | |
| 4'-fluoro-2-hydroxy-4-methoxy-benzophenone | 88.0–89.0 | | | |

[1] All compounds listed are soluble in benzene ethanol (absolute), methyl ethyl ketone, ethyl acelate, n-hexane and cyclohexane.
[2] Melting points determined by the Kofler microscopic method.
[3] Normal boiling points (760 mm. Hg) determined by vacuum distillation and extrapolation using Vapor Pressure-Temperature Monograph.
[4] Manufacturer gives melting point as 65–66° C.

Example 2

Using the method of formulation of Example 1, an increase in yield results from the substitution of 22 parts of titanium tetrachloride for the aluminum chloride.

Example 3

In the method of Example 1, the substitution of carbon disulfide in the same amount for n-hexane yields 3'-trifluoromethyl-2,4-dimethoxybenzophenone.

Example 4

The substitution of 22 parts of titanium tetrachloride for the aluminum chloride of Example 3 provides an increase in yield for the product 3'-trifluoromethyl-2,4-dimethoxybenzophenone. Similar runs using the appropriate fluoro-, fluoroalkyl- or fluoroalkenyl- substituted benzoyl chloride for the meta trifluoromethyl benzoyl chloride of Examples 2, 3 and 4 produced the corresponding fluoro-substituted-2,4-dimethoxy benzophenone. The physical properties of representative compounds produced by the methods of Examples 2, 3 and 4 are presented in Table II and compared with a commercial sample of 2,4-dimethoxy benzophenone.

TABLE II

| Compound [1] | Melting Point [2] (° C.) | Elemental Analysis | |
|---|---|---|---|
| | | Calculated | Found |
| 2,4-dimethoxybenzophenone (commercial sample). | 81.5–82.0 | C, 74.36; H, 5.82 | C, 74.52; H, 5.71. |
| 2'-trifluoromethyl-2,4-dimethoxybenzophenone. | 45.0–47.0 | C, 61.94; H, 4.22; F, 18.4 | C, 61.99; H, 4.25; F, 17.8 |
| 3'-trifluoromethyl-2,4-dimethoxybenzophenone. | 85.5–86.0 | C, 61.94; H, 4.22; F, 18.4 | C, 62.03; H, 4.30; F, 18.0 |
| 4'-trifluoromethyl-2,4-dimethoxy-benzophenone. | 92.5–93.0 | C, 61.94; H, 4.22; F, 18.4 | C, 62.06; H, 4.12; F, 18.0 |
| 2'-fluoro-2,4-dimethoxybenzophenone | 75.7–76.5 | | |
| 3'-fluoro-2,4-dimethoxybenzophenone | 40.0–41.5 | | |
| 4'-fluoro-2,4-dimethoxybenzophenone | 102.0–102.8 | | |

[1] All compounds listed on this page are soluble in benzene, ethanol (absolute), methyl ethyl ketone, ethyl acetate, n-hexane and cyclohexane.
[2] Melting points determined by the Kofler microscopic method.

Example 5

Utilizing a three-necked flask equipped with a reflux condenser, stirrer and dropping funnel, 100 parts of carbon disulfide and 13.3 parts of anhydrous aluminum chloride are mixed with 20.8 parts of meta-trifluoromethylbenzoyl chloride. Resorcinol, 13.2 parts, dissolved in 50 parts of carbon disulfide is added slowly and the whole is then refluxed with stirring for twenty hours. After hydrolysis with 100 parts of water and 100 parts of 15 percent hydrochloric acid, the dark brown solution is extracted with benzene. Evaporation of the benzene extract gives a dark brown oil which is taken up in toluene and treated with decolorizing carbon. Concentration of the toluene filtrate and cooling at Dry-Ice temperatures gives tan crystals which are recrystallized three more times from toluene to yield white crystals of 3'-trifluoromethyl-2,4-dihydroxybenzophenone. Other fluorine-containing 2,4-dihydroxybenzophenones are obtained in a similar manner by substituting the appropriate fluoro-, fluoroalkyl- or fluoroalkenyl-substituted benzoyl chloride for the meta-trifluoromethyl benzoyl chloride of this example. The physical properties of representative compounds produced by the method of Example 5 are compared with a commercial sample of 2,4-dihydroxy benzophenone in Table III.

TABLE III

| Compound [1] | Melting Point [2] (° C.) | Elemental Analysis | |
|---|---|---|---|
| | | Calculated | Found |
| 2,4-dihydroxybenzophenone (commercial sample). | 142.5–143.0 | | |
| 2'-trifluoromethyl-2,4-dihydroxybenzophenone. | 168–168.5 | C, 59.58; H, 3.21; F, 20.2 | C, 59.94; H, 3.21; F, 20.6. |
| 3'-trifluoromethyl-2,4-dihydroxybenzophenone. | 175.5–176.0 | C, 59.58; H, 3.21; F, 20.2 | C, 59.92; H, 3.10; F, 19.6. |

[1] All compounds listed on this page are soluble in benzene, ethanol (absolute), methyl ethyl ketone, ethyl acetate and insoluble (less than 3 percent) in n-hexane and cyclohexane.
[2] Melting points determined by Kofler microscopic method.

The compounds of this invention have a high absorbency index in the most damaging ultraviolet region and a low absorptivity in the visible spectrum. The low volatility and the increased solubility of these compounds contribute to their effectiveness since there is little tendency to evaporate during the heating of the plastic substrate. The improved solubility of these compounds, especially in hydrocarbon solvents can be related to their compatibility in polyolefins such as polypropylene, polyethylene, poly-4-methylpentene-1, poly-3-methyl butene-1 and other poly-alpha-olefins. These compounds can be utilized in the stabilization of a wide variety of synthetic resinous polymeric materials such as; cellulose nitrate, oleoresinous phenolic varnish, polypropylene, polyvinyl chloride, vinylidene chloride-vinylchloride co-polymer, oleoresinous soybean alkyd, polyamide, polyformaldehyde, cellulose, polyethylene, polyhaloethylene, styrene-modified polyesters, epoxy cellulose acetate, and polystyrene. The stabilizers described herein can be formulated in the plastic substrate by the usual methods such as dry blending, melt blending, and solvent deposition. They are generally utilized in amounts of about 0.1 to 5.0 percent by weight of the base plastic with an amount of about 1.5 percent preferred; and may be used in conjunction with other common additives, such as pigments, fillers and plasticizers. They can also be employed in combination with other light stabilizing additives.

What is claimed is:
1. The compound 2'-trifluoromethyl-2-hydroxy-4-methoxybenzophenone.
2. The compound 3'-trifluoromethyl-2-hydroxy-4-methoxybenzophenone.
3. The compound 4'-trifluoromethyl-2-hydroxy-4-methoxybenzophenone.
4. The compound 2'-trifluoromethyl-2,4-dimethoxybenzophene.
5. The compound 3'-trifluoromethyl-2,4-dimethoxybenzophenone.
6. The compound 4'-trifluoromethyl-2,4-dimethoxybenzophenone.
7. The compound 2'-trifluoromethyl-2,4-dihydroxybenzophenone.
8. The compound 3'-trifluoromethyl-2,4-dihydroxybenzophenone.

References Cited
UNITED STATES PATENTS

| | | | |
|---|---|---|---|
| 2,773,903 | 12/1956 | Hardy et al. | 260—591 |
| 2,872,421 | 7/1958 | Dupont | 260—591 |

OTHER REFERENCES

Hormann: Chemical Abstracts 63, 2552C (1963).
Gray: Chemical Abstracts 63, 14743f (1963).

DANIEL D. HORWITZ, *Primary Examiner.*